UNITED STATES PATENT OFFICE.

CHARLES M. HIGGINS, OF BROOKLYN, NEW YORK.

ADHESIVE.

SPECIFICATION forming part of Letters Patent No. 579,827, dated March 30, 1897.

Application filed March 30, 1896. Serial No. 585,476. (No specimens.)

*To all whom it may concern:*

Be it known that I, CHARLES M. HIGGINS, a citizen of the United States, residing at Brooklyn, in the county of Kings and State of New York, have invented certain new and useful Improvements in the Manufacture of Flour and Starch Pastes, of which the following is a specification.

The object of my invention is to produce an improved paste or adhesive compound directly from common flour or starch which shall possess much greater adhesive power and tenacity and more homogeneity and durability than any previous starch or flour paste and which shall even be superior to pastes made directly from dextrine and be producible at much less cost and with greater ease and facility of manufacture.

In making my improved paste I digest the flour or starch directly in hot water impregnated with a free acid or other digesting agent adapted to dissolve the gluten and convert or digest the starch into a soluble or partly-soluble form, and I continue the digestion rapidly until the pasty mixture becomes partly or fully liquefied at or about 190° Fahrenheit, and I then run the liquid solution into jars or receptacles and allow the same to cool and rest until the contained liquid assumes a pasty form. Previous to running off the liquid solution I add a neutralizing substance to neutralize the acid, preferring for this purpose borax in excess or such ingredients as will form borax in the solution, for I find that while borax or boric acid have no action on either raw or boiled starch they enter into chemical combination with it as soon as it acquires a soluble or partly-soluble form and render its solubility permanent and greatly add to the adhesiveness and homogeneity of the resulting paste.

My invention therefore consists, mainly, in the features above outlined, as hereinafter fully set forth and claimed.

In making my improved paste or adhesive compound I can use any of the ordinary cereal flours made from wheat, rye, rice, corn, &c., or any of the starches from corn, wheat, potatoes, &c., or any mixture of the same, each material producing compounds or pastes of individually-different qualities adapted for different purposes, as will be understood. I will therefore now fully describe my novel process of paste manufacture, and I will first give a model formula which may be used with any of the flours or starches or with mixtures of the two and which will epitomize the process and enable it to be seen in a paragraph.

To one gallon of water add about one fluid ounce of commercial sulfuric acid and six ounces (avoirdupois) of boric acid. Heat this acidulated water to about 145° Fahrenheit and add four pounds of the desired flour or starch. Mix thoroughly, and while the mixture is kept continually stirred or agitated continue the heat and raise it rapidly to about 195° or thereabout until the resulting pasty mixture becomes partly or fully liquefied. Then stop the heat and add four to five fluid ounces of caustic soda-lye of 40° Baumé, which will neutralize both acids in the solution and give it an alkaline reaction. After the foregoing have been well mixed finally add three fluid ounces of aqua-ammonia of 20° Baumé, which is about one sixty-fourth of the volume of the solution, and mix intimately. Then run the hot neutralized solution directly into jars or other receptacles in which the product is to be sold and cool the same and let them rest until the contents assume a soft or firm pasty form, according to the consistency desired, and the product will be then ready for the market.

In the above process the acidulated water should be heated preferably in a jacketed steam-kettle so constructed that a large quantity of heat can be applied rapidly and steadily to the mass, as rapid and even action of the heat is important in the process. The cooking-kettle should also be provided with an energetic stirrer or mixer kept in constant motion during the process, and this stirrer should be very strong and powerful to move the thick pasty mass which is formed when the temperature reaches 150° to 160°. The complete process described usually takes from about twenty to forty minutes from the moment when the starch is added to the time when the solution is neutralized and run off, and its phases are about as follows: In about three minutes after adding the starch the mass stiffens into a white dough at about 150°. In six minutes, at 155°, a stiff white jelly is formed. In ten minutes, at 165°, this changes to a translucent jelly, and in about fifteen minutes, at 170°, it becomes a soft translucent jelly, gradually liquefying. In about twenty minutes this soft jelly becomes fluent, at about 180°, and in about five minutes more changes to a liquid jelly, opalescent in color, at about 185°. In, say, thirty minutes the mass becomes a syrupy opalescent liquid at about 190°, and from 190° to 200°, within a total of thirty-five to forty minutes, the liquid becomes a little thinner, but is yet opalescent.

It will be understood that where the volumes or masses acted on are very large the time required to reach each of the phases stated will be somewhat longer, depending on the time necessary for the heat to penetrate the mass to the stated temperatures. The times given are absolutely correct for the model formula, but will vary somewhat for larger masses, as will be readily appreciated.

It will be noted that by heating the acidulated water as high as possible, but below or about the temperature of the paste formation, and then adding the dry starch or flour directly thereto and mixing vigorously while continued heat is applied, the operations of mixing and digesting are simplified and the process rendered rapid, direct, and continuous and on the whole mass of starch at once, which is important for this purpose. On the contrary, if the starch were separately mixed in a milky fluid with a portion of water, which was then poured into the main portion of highly-heated acid-water, as is usually done in making glucose, the operation would be more indirect and troublesome and consume much more time, and the first part of the starch would receive more heat action than the last and the starch would remain much longer under the converting action, which would cause it to pass completely over into the dextrine or glucose state, which it is important to avoid in this process. Instead, however, of first heating the acidulated water to about 145° and then adding the starch the starch may be added to the acidulated water when cold and the heat and agitation then applied continuously until the process is completed, as described.

Any other digesting substance or acid may be used in lieu of the sulfuric, but this I consider much preferable, as less of it is required, and its action is much quicker and its neutralization forms simple and harmless sulfates in the final product which are in no way objectionable, for it will be noted that in my process the products of neutralization remain in the finished product. If sulfurous acid be used as the digester, a sulfite will be left in the product, which will act as an antiseptic and be actually advantageous. Malt may also be used as the digesting agent, but with this the temperature has to be carefully kept at or below 165°, and it is more likely to develop the sugar or glucose state immediately and to form a thinner and darker product, and I therefore prefer acids, as set forth.

The boracic acid, while having no action on raw or boiled starch, as before stated, acts in the presence of the sulfuric acid to assist in the digesting action, and, what is still more important, enters into chemical combination with the starch as soon as it becomes changed to a soluble or partly-soluble form and holds it in this state and renders its solubility permanent. When this boracic acid is subsequently neutralized by the caustic soda, it becomes changed into borax, which makes still more energetic combination with the digested starch and renders it much more adhesive and tenacious, greatly increases the body of the solution, and renders it more smooth and homogeneous. This combination of the boron compound takes place more effectually at a hot temperature. The ammonia or other caustic alkali added after the formation of the borax acts to produce a still further thickening effect and further increases the adhesiveness of the compound, and also renders it perfectly proof to decay, while the presence of the volatile alkali is not objectionably apparent to the senses. This action of the ammonia or other caustic alkali, however, will take place perfectly at a hot or cold temperature, but I prefer to add it at about 150°.

Another effect of the boron compound in the presence of the alkali is to prevent the alkali from darkening the color of the paste, for if the boron compound were omitted great care would have to be used in adding the neutralizing alkali, so that exact neutrality was reached as the slightest excess of the caustic alkali would render the paste very brownish or yellowish, whereas in the presence of the boron compound a small excess of alkali, which is really desirable, has no effect on the color, which in this case remains creamy in the flour pastes and pure white in starch pastes, which is a most important advantage.

The proportion of ingredients may of course be altered where a thicker or thinner paste or adhesive is required, as I have given about the average proportion in the model formula; but the flour or starch may vary from, say, three or less to seven or more pounds to the gallon of water, two to seven being about the extremes, while four to five is the medium. The proportion of other ingredients should vary to correspond with the starch or flour, except the digesting-acid, which is preferably increased a little, but need not necessarily increase in proportion to the increase of flour or starch, but should always increase where the proportion of the water increases.

It should be understood that where the amount of acid is reduced or the proportion of starch is increased from that set forth in the model formula the time required to complete the process will be longer than thirty or forty minutes and may extend to sixty minutes, more or less, according to the proportions of starch and acid, and, *per contra*, where the amount of acid is increased or of starch decreased the time required will be less than that given for the model formula, as will be understood.

A greater proportion of acid may be used than that stated, but I prefer to limit it to the lowest practicable, as I desire to avoid the full conversion of the starch into dextrine and glucose, which is likely to happen if much acid is used and if the heat and digesting action are continued long or if the temperature be very high. I therefore prefer not only to have the digesting action as direct and rapid as possible and uniformly on the whole mass of starch at once, as described, but to arrest this action just when actual digestion takes place, that is, when the starch changes from the gelatinous to the fluent form, but while it is still whitish or opalescent and before transparent or clear thin fluidity occurs, which preferred condition will occur in my process as described in from twenty to thirty minutes or thereabout after the starch is added, thus making the process as rapid and simple, if not more so, than the common process of boiling a simple starch or flour paste.

Instead of adding boracic acid to the acidulated water I may omit it altogether, but afterward add borax to the digested solution in place of the caustic soda, which will then neutralize the digesting-acid and combine with the digested starch. In the formula given the correct proportion of borax would be about fourteen ounces, a large excess over neutrality being desirable to combine with the digested starch, and this I would add before the starch becomes fully liquefied and while in in the state of a soft fluent jelly at about 175° to 185°. When added at this point, the borax has the effect of thinning the solution and renders the starch more soluble and combines with it to make it permanently soluble. The borax may be added later, say, from 190° to 200°, but if added too late, say, beyond 200°, it would be likely to render the product too thin or liquid, as it seems to exert an actual digesting action on the starch after this action has been started by the digesting-acid; but of course where a very thin product is desired the heat can be continued and the borax added later. In the same way if the heat and digesting action were continued too long or much above 195° and much over thirty or forty minutes, unless the proportion of starch were very large or of acid were very small, the starch would have passed over too much into the state of veritable dextrine or glucose, and the product when finished would not be a more or less fluent paste of great adhesive power and good body or viscosity, but rather a thin liquid of diminished adhesive power, which it is desirable to avoid. Hence by conducting the process rapidly and uniformly and arresting the digestion before the state of veritable dextrine is reached and at the point where the starch becomes soluble, or partly so, and where it is capable of combining with the boron compound, a very novel paste or adhesive compound of great value is produced, for it possesses far more adhesive power, more body, and viscosity than is possessed by any paste that can be made from dextrines, for in this case it seems that the starch simply loses its gelatinous insoluble form and acquires a state of white glutinous viscid solubility which may be said to be a distinct state. Hence I prefer to arrest the digestion, as before stated, at the point where the starch ceases to be pasty or gelatinous and where it becomes fluent, but before it has lost its white or opalescent color, while it still gives a blue, violet, or purple color with iodin before it becomes transparent and thin and before it gives the decided reddish or claret-wine color with the iodin. It will be understood, however, that where the amount of acid is reduced the maximum temperature may be higher without carrying the conversion beyond the condition stated, and *per contra* where the acid is increased a lower maximum temperature can be used.

By arresting the digesting action earlier or later, that is, anywhere between the point where the mixture becomes a fluent jelly to the point where it becomes a thin liquid, different degrees of body or consistency can be imparted to the finished product, which is an important advantage of this process, as will be understood. A firmer consistence can also be imparted to the finished product by a forcible or continued cooling or refrigeration of the solution when run into the jars on the principle set forth in my United States Patent No. 546,401, of September 17, 1895. In the aforesaid patent the consistency of a dextrine paste is regulated and determined by limiting the heat in making the solution and in afterward applying continued cold or refrigeration to the liquid when bottled or sealed; but this will not be necessary in my present process unless the digestion has been carried too far, because by arresting the digestion at the desired point when the solution is neutralized and run into the jars a simple rapid cooling will usually set the paste into the desired consistency, which is a further advantage of this process.

In the United States Patent No. 466,239, of December 29, 1891, I describe and claim a combination of dextrine with a boron compound combined in hot aqueous solution with an alkali afterward added thereto. It will be noted that my present invention covers the boron compound united directly with starch while being digested or in a soluble state or as it is approaching incipient or nascent dextrine, which is a new discovery of great advantage, as it enables an adhesive compound to be produced directly from common flour or starch, which is far superior to that which can be produced from dextrine and at far less cost. Indeed, so much is this the fact that by my new process three or four pounds of starch to one gallon of water may be made to produce a paste of greater body and adhesive power than can be produced with five to six pounds of dextrine and at about one-third the cost, thus producing most valuable results. In addition to this advantage of body, adhesiveness, and cost the pastes made by the new process are far superior in appearance in possessing a much lighter and purer color and are much more uniform in quality, and their consistencies and other properties can be more readily and uniformly regulated at will than is the case with pastes made from dextrines.

A great variety of pastes or adhesive compounds can be produced by this system adapted for almost all purposes and at costs to suit all purposes from the lightest to the strongest work by the use of different flours or starches or mixtures of them and of greater or less densities, according to the proportions used, and as I have fully set forth the process and the best conditions for the manufacture and the best proportions and variations it will not be necessary to specifically describe each individually different product which might be produced. I will mention, however, that some most remarkable adhesives can be produced by this process which can be readily substituted for glues and gelatins in many kinds of work. For example, when from five to seven pounds of corn-starch to the gallon of water is used in the formula given a glue-like paste is produced which is almost equal to the best animal glues and has the most extraordinary cementing power for fibrous and absorbent substances, as it will unite wood to wood nearly as firmly as gelatin, that is, the joint cannot be separated without breaking the wood at some point, and it will also unite leather to leather or leather to wood, so that the leather will tear or laminate in attempting to separate the joint. This paste is of a pure creamy white, slightly translucent, and in general qualities it could be readily mistaken for a solution of the best gelatin except that it has a much whiter and more opaque color and has about the same consistency and flowing qualities in the cold that a strong solution of gelatin or isinglass has when hot, that is, it will spread with great ease and smoothness, does not sink into absorbents, and adheres at once and with great tenacity to almost all substances and is so very glutinous and tenacious that it will draw or spin out into ropy or silky threads when manipulated, so much so that it would be difficult to convince the ordinary observer that it is not a remarkably white and fine glue instead of being purely a starch cement.

In the case of simple flour pastes made by this process not only is the cost no greater than in the usual process of making common flour pastes, but a flour paste of most unique and superior qualities is produced. It will be noted that in my process not only is the starch of the flour rendered soluble, but so also is the gluten, which becomes dissolved by the weak digesting-acid at the outset and also by the borax and alkali afterward added. Hence both ingredients of the flour, representing, in the case of wheat, sixty-seven and thirty-three per cents. respectively, become changed into a soluble tenacious form and united in perfect combination or solution in the water of the paste, whereas in ordinary flour paste the sixty-seven per cent., of starch is always more or less inert and separable. Hence my new flour paste is not only homogeneous and permanent, but has unusual body-density and adhesive power, is very smooth and spreads easily, does not show watery separation, and is practically proof to decay, and thus presents a great advance in the art of paste manufacture.

As the process herein described of making an adhesive paste from flour or starch with or without the boron compound is novel, I do not of course limit myself to the inclusion of the borax or other boron compound, and hence any other suitable substance may be used in neutralizing the digesting-acid, or this substance may be sometimes omitted for purposes where a small trace of acid in the paste will not be objectionable.

I am aware of the process described in the English Patent No. 2,810 of 1865, but this is distinct from my invention, as in that patent the starch is converted into gum or dextrine, and the product is a thin fluid or size for saturating textiles. In my process the starch is not converted into dextrine, but into an intermediate state between starch and dextrine, and the product is a tenacious paste having great cementing power.

I lay no claim to what is known in technical chemical books as "soluble starch"—viz., an alleged form of starch which has been separated from a solution of common starch during the process of its digestion from gelatinous paste to actual dextrine. This soluble starch has usually been obtained from a liquid filtered solution or separated from a dextrine syrup from which it has been precipitated in the form of granules or powder, which powder or granules are soluble in hot water, but not in cold water. My invention does not relate to the production or isolation of any such substance.

My invention consists, essentially, in a new process of making an adhesive paste from raw starch or flour, which consists in heating the starch paste in a digesting fluid until the whole mass becomes changed to a fluent or partly-soluble form, but not converted into dextrine, arresting the action at this point and then cooling the whole fluent mass and causing it to set into a semifluid or pasty form. This has not been heretofore done, and it forms an absolutely novel process and product in the art of paste manufacture.

In order that my improved process and product be more effectually distinguished and differentiated from what has been heretofore known, it is proper that I here describe what I consider to be certain distinct stages in the transformation of the starch particle, which are as follows:

First. The "gelatinous" or simple "swelled" state, such as exists in simple starch paste made with raw starch and hot or boiling water. The condition produced by the action of dilute cold solutions of caustic alkalies on raw starch is also merely the gelatinous condition and is substantially the same as that produced by the action of hot water. There is a second stage, however, in the transformation, which I call the "glutinous" stage, where the starch loses its thick inert gelatinous form and becomes glue-like and fluent, capable of being spread like liquid glue and having an extraordinary adhesiveness, like glue.

Third. The "soluble-starch" state, where the starch particle is still more transformed, approaching a gummy condition, but not yet actually dextrine, and forms more or less pasty mixtures when sufficiently dense.

Fourth. The actual clear gummy or dextrine state, which is freely soluble in cold or warm water and forming dense permanently-fluid solutions, either hot or cold.

Fifth. The glucose or sugar stage, intensely soluble in water.

Now the second and third stages are what are produced in my process and product, usually a combination of the two, although it may be almost wholly one or the other, according as the digestion has been arrested earlier or later, as already described. The greatest adhesive power of the starch, however, lies in the glutinous stage, which is a fact not heretofore properly known or appreciated. In the gelatinous stage the starch is practically inert and has little adhesiveness, as the particle or granule is merely swelled up and has not yet entered into actual solution or combination with the water and requires such a very large percentage of water to thus swell it up into a spreadable paste that the gelatinous mixture is very weak or dilute as regards the actual percentage of starch involved. In the glutinous stage, however, the starch particle begins to enter into actual solution or combination with the water, and a comparatively dense fluent solution of extraordinary adhesiveness can be obtained about twice or four times the density that can be obtained in the gelatinous state, which same density in the gelatinous stage would be almost solid, rubber-like, or wholly non-fluent and inert. After the starch particle passes the glutinous stage it gradually loses its greatest adhesive strength, but acquires greater solubility, so that when it has reached toward the end of the soluble stage and entered the dextrine stage it is so very soluble as to make very dense and permanently-fluid solutions, either hot or cold. Its loss of adhesive strength at these stages, however, can be made up partly by increased density of solution, but never with the same quality that it possesses in the glutinous stage, where a density of half the strength will give as much body and more actual adhesiveness than twice the density in the early or late part of the dextrine stage. Now the soluble starch heretofore referred to as mentioned in chemical books is something which has been separated or isolated from the fluid solution at a stage in the transformation where the solution becomes permanently fluid and beyond either of the stages produced in my invention.

What I claim as my invention is—

1. The improved process of making a flour paste, consisting in digesting the flour in hot water impregnated with a digesting substance until the gluten is dissolved and the starch rendered soluble, or partly so, and the mass thereby liquefied, then arresting the digesting action before it becomes converted into dextrine and cooling the liquefied mass and allowing it to rest until it sets into a semifluid or pasty form, substantially as herein set forth.

2. The improved process of making a starch paste herein described, consisting in digesting raw starch in a hot digesting liquid till it becomes fluent and in that glutinous or soluble state before it becomes converted into dextrine, arresting the digestion at this point, and finally running the fluent mass into jars or receptacles and allowing the same to cool and rest until set into a semifluid or pasty form, substantially as herein set forth.

3. The improved process described of making a starch or flour paste, consisting in heating a mixture of starch or flour with water impregnated with a digesting-acid rapidly to or about to 190°, arresting the heat and digesting action when the mixture becomes liquefied and while in that white or opalescent glutinous or soluble state before it becomes converted into dextrine, adding a neutralizing substance to the solution and allowing the same to cool and rest until set into a semiliquid or pasty form, substantially as herein set forth.

4. The process of making an improved starch or flour paste in the manner and proportions described, viz., adding to a given mass of digesting fluid a mass of starch or flour equal to half or more of the weight of the fluid, keeping the mixture agitated and applying heat to the whole mass uniformly at once until it reaches 190° or thereabout and becomes an opalescent liquid, arresting the action before it becomes converted into dextrine, and finally cooling the said liquid until set into a pasty form, substantially as herein set forth.

5. The improved process of making a starch or flour paste, herein described, consisting in digesting raw starch in a hot digesting liquid till it becomes fluent and in that glutinous or soluble state before it becomes converted into dextrine, arresting the digestion at this point and finally running the fluent mass into jars or receptacles and applying continual cold or refrigeration thereto until the liquid contents are set into a pasty form, substantially as herein set forth.

6. The improved process of making a starch or flour paste, consisting in digesting the starch or flour in hot acidulated water till it becomes fluent and in that glutinous or soluble stage before it becomes converted into dextrine, then adding to the acid solution an alkaline sodium compound in excess to neutralize the acid and give the solution a decided alkaline reaction and then cooling the solution until set into a semifluid or pasty form, substantially as herein set forth.

7. An improved adhesive compound consisting essentially of starch digested in water till it becomes fluent and in that glutinous or soluble stage before it becomes converted into dextrine, and then arrested and cooled in this state, forming a homogeneous tenacious paste, substantially as herein specified.

8. An improved adhesive compound consisting of starch digested in water till it becomes wholly or partly fluent or soluble but before it becomes converted into dextrine, and then combined with a boron compound, forming a homogeneous tenacious paste, substantially as herein set forth.

9. An improved adhesive compound, consisting of starch digested in water into a fluent or soluble form in that state preceding the conversion into dextrine and then combined with a boron compound with a caustic alkali afterward added thereto, substantially as and for the purpose herein set forth.

10. An improved adhesive paste or compound formed by heating a mixture of starch and water with a converting-acid in the presence of dissolved boracic acid until liquefied, and then adding caustic soda to neutralize both acids and form borax in said solution, substantially as set forth.

11. The specific process herein described for making an improved paste directly from starch or flour, viz., mixing the dry starch or flour with acidulated water at a temperature below or about the paste formation, and keeping the mixture constantly agitated while the heat is applied, continuing the heat and agitation till the pasty mixture becomes liquid and attains a temperature of 190° Fahrenheit, or thereabout, adding a neutralizing substance to the solution, discontinuing the heat and running the hot neutralized solution into jars or packages and causing the same to cool and rest until the liquid assumes a semiliquid or pasty form, substantially as herein set forth.

CHAS. M. HIGGINS.

Witnesses:
JNO. E. GAVIN,
HENRIETTA H. NICOLAI.